United States Patent
Kim et al.

(10) Patent No.: US 9,794,310 B2
(45) Date of Patent: Oct. 17, 2017

(54) META DATA INFORMATION PROVIDING SERVER, CLIENT APPARATUS, METHOD OF PROVIDING META DATA INFORMATION, AND METHOD OF PROVIDING CONTENT

(75) Inventors: Yong-ku Kim, Suwon-si (KR); Myong-kyun Lim, Seoul (KR); Hyu-sun Shim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1018 days.

(21) Appl. No.: 11/876,226

(22) Filed: Oct. 22, 2007

(65) Prior Publication Data

US 2008/0172451 A1 Jul. 17, 2008

Related U.S. Application Data

(60) Provisional application No. 60/884,514, filed on Jan. 11, 2007.

(30) Foreign Application Priority Data

Mar. 8, 2007 (KR) .................................. 2007-23196

(51) Int. Cl.
*G06F 15/16* (2006.01)
*H04L 29/06* (2006.01)
(Continued)

(52) U.S. Cl.
CPC .... *H04L 65/4076* (2013.01); *H04L 29/06027* (2013.01); *H04L 65/4084* (2013.01);
(Continued)

(58) Field of Classification Search
CPC . H04L 67/04; H04L 67/2842; H04L 67/2861; H04L 67/06; H04L 65/4076;
(Continued)

(56) References Cited

U.S. PATENT DOCUMENTS 5,793,410 A * 8/1998 Rao ..................... H04N 21/6587
348/E5.002
5,926,204 A * 7/1999 Mayer ................. H04N 7/17318
348/E7.071
(Continued)

FOREIGN PATENT DOCUMENTS

| CN | 1418422 | 5/2003 |
|----|---------|--------|
| CN | 1640130 | 7/2005 |

(Continued)

OTHER PUBLICATIONS

Chinese Office Action dated Aug. 10, 2010 corresponds to Chinese Patent Application No. 200810002844.4.
(Continued)

*Primary Examiner* — Lance L Barry
(74) *Attorney, Agent, or Firm* — Staas & Halsey LLP

(57) ABSTRACT

An apparatus and/or a method for efficiently providing meta data information regarding content and the content to a user includes connecting to a meta data information providing server that provides meta data of at least one content, receiving fundamental meta data information including connection information, which is provided for retrieval of content, from the meta data information providing server, and, when predetermined content is selected, connecting to one of the content providing servers that provide the selected content using the connection information and obtaining the selected content from the connected content providing server. Thus, it is possible to rapidly access a content providing server that provides user desired content using fundamental meta data information received from a meta data.

17 Claims, 9 Drawing Sheets

(51) Int. Cl.

| | |
|---|---|
| H04N 21/235 | (2011.01) |
| H04N 21/414 | (2011.01) |
| H04N 21/434 | (2011.01) |
| H04N 21/435 | (2011.01) |
| H04N 21/472 | (2011.01) |
| H04N 21/643 | (2011.01) |
| H04N 21/84 | (2011.01) |
| H04L 29/08 | (2006.01) |

(52) U.S. Cl.
CPC .......... *H04L 65/4092* (2013.01); *H04L 67/04* (2013.01); *H04L 67/06* (2013.01); *H04L 67/101* (2013.01); *H04L 67/1002* (2013.01); *H04L 67/1008* (2013.01); *H04N 21/235* (2013.01); *H04N 21/41407* (2013.01); *H04N 21/435* (2013.01); *H04N 21/4345* (2013.01); *H04N 21/47202* (2013.01); *H04N 21/643* (2013.01); *H04N 21/84* (2013.01)

(58) Field of Classification Search
CPC ............. H04L 67/1002; H04L 67/1008; H04L 67/101; H04L 65/4084; H04L 65/4092; H04L 29/06027; H04N 21/41407; H04N 21/4345; H04N 21/435; H04N 21/47202; H04N 21/06
USPC ........................................................ 709/217
See application file for complete search history.

(56) References Cited

U.S. PATENT DOCUMENTS

| | | | | |
|---|---|---|---|---|
| 5,961,582 | A * | 10/1999 | Gaines | G06F 9/4843 718/1 |
| 6,044,399 | A * | 3/2000 | Elledge | H04L 29/06 709/220 |
| 6,295,479 | B1 * | 9/2001 | Shima et al. | 700/83 |
| 6,496,862 | B1 * | 12/2002 | Akatsu et al. | 709/224 |
| 6,505,255 | B1 * | 1/2003 | Akatsu et al. | 709/239 |
| 6,523,064 | B1 * | 2/2003 | Akatsu et al. | 709/226 |
| 6,606,658 | B1 * | 8/2003 | Uematsu | H04L 43/045 709/223 |
| 6,633,547 | B1 * | 10/2003 | Akatsu et al. | 370/255 |
| 6,654,344 | B1 * | 11/2003 | Toporek | H04B 7/18589 370/230 |
| 6,795,858 | B1 * | 9/2004 | Jain | H04L 67/1008 709/226 |
| 6,804,708 | B1 * | 10/2004 | Jerding | G06Q 30/06 348/E5.002 |
| 6,820,278 | B1 * | 11/2004 | Ellis | 725/80 |
| 6,915,528 | B1 * | 7/2005 | McKenna, Jr. | 725/37 |
| 6,918,123 | B1 * | 7/2005 | Shteyn | 719/318 |
| 6,954,641 | B2 * | 10/2005 | McKenna et al. | 455/435.1 |
| 6,980,977 | B2 * | 12/2005 | Hoshi et al. | 707/1 |
| 7,032,177 | B2 * | 4/2006 | Novak et al. | 715/723 |
| 7,036,091 | B1 * | 4/2006 | Nguyen | 715/834 |
| 7,051,360 | B1 * | 5/2006 | Ellis et al. | 725/136 |
| 7,096,185 | B2 * | 8/2006 | Reichardt et al. | 704/275 |
| 7,260,599 | B2 * | 8/2007 | Bauch | H04L 29/06 709/202 |
| 7,308,475 | B1 * | 12/2007 | Pruitt | H04L 29/12113 709/203 |
| 7,321,926 | B1 * | 1/2008 | Zhang | G06F 9/5033 455/453 |
| 7,346,676 | B1 * | 3/2008 | Swildens | H04L 67/1008 709/223 |
| 7,424,526 | B1 * | 9/2008 | Hansen | H04L 12/2697 370/232 |
| 7,532,642 | B1 * | 5/2009 | Peacock | H04L 43/0864 370/252 |
| 7,979,549 | B2 * | 7/2011 | Frost | H04L 47/10 709/226 |
| 8,073,941 | B2 * | 12/2011 | Binyamin | H04L 67/16 709/203 |
| 2001/0054002 | A1 * | 12/2001 | Suzuki et al. | 705/14 |
| 2002/0026560 | A1 * | 2/2002 | Jordan et al. | 711/120 |
| 2003/0046704 | A1 * | 3/2003 | Laksono | H04N 7/17336 725/96 |
| 2003/0084180 | A1 * | 5/2003 | Azami | 709/231 |
| 2003/0195925 | A1 * | 10/2003 | Kaneko et al. | 709/203 |
| 2004/0033806 | A1 * | 2/2004 | Daniel et al. | 455/450 |
| 2004/0193951 | A1 * | 9/2004 | Shaffer et al. | 714/9 |
| 2004/0208480 | A1 * | 10/2004 | Yoon et al. | 386/69 |
| 2004/0246376 | A1 * | 12/2004 | Sekiguchi et al. | 348/468 |
| 2004/0258089 | A1 * | 12/2004 | Derechin | G06F 9/54 370/465 |
| 2004/0268393 | A1 * | 12/2004 | Hunleth | G06F 3/0482 725/44 |
| 2005/0010422 | A1 * | 1/2005 | Ikeda | G10L 15/30 704/277 |
| 2005/0038890 | A1 * | 2/2005 | Masuda | H04L 29/06 709/224 |
| 2005/0055716 | A1 * | 3/2005 | Louie et al. | 725/58 |
| 2005/0076136 | A1 * | 4/2005 | Cho | H04L 29/06027 709/231 |
| 2005/0135341 | A1 * | 6/2005 | Kim | 370/352 |
| 2005/0182792 | A1 * | 8/2005 | Israel | G06F 17/30038 |
| 2005/0210501 | A1 * | 9/2005 | Zigmond et al. | 725/32 |
| 2005/0278364 | A1 * | 12/2005 | Kamen | H04N 7/17318 |
| 2006/0106938 | A1 * | 5/2006 | Dini | G06F 11/008 709/228 |
| 2006/0150234 | A1 * | 7/2006 | Lee et al. | 725/135 |
| 2006/0200736 | A1 * | 9/2006 | Smit | H04L 29/06027 715/203 |
| 2006/0235974 | A1 * | 10/2006 | Ueda | G06F 9/5083 709/226 |
| 2007/0033531 | A1 * | 2/2007 | Marsh | 715/738 |
| 2007/0136413 | A1 * | 6/2007 | Ishikawa | H04L 29/06027 709/200 |
| 2007/0156440 | A1 * | 7/2007 | Sorisho | G06Q 30/06 705/1.1 |
| 2007/0180066 | A1 * | 8/2007 | Sherwood et al. | 709/220 |
| 2007/0199022 | A1 * | 8/2007 | Moshiri et al. | 725/39 |
| 2009/0028192 | A1 * | 1/2009 | Rieger et al. | 370/535 |

FOREIGN PATENT DOCUMENTS

| | | |
|---|---|---|
| EP | 1 638 336 | 3/2006 |
| KR | 10-2005-0062849 A | 6/2005 |
| WO | 98/26559 | 6/1998 |
| WO | 2006/009342 | 1/2006 |

OTHER PUBLICATIONS

Korean Office Action dated Apr. 27, 2011 in corresponding Korean Patent Application 10-2007-0023196.

* cited by examiner

META DATA INFORMATION PROVIDING SERVER, CLIENT APPARATUS, METHOD OF PROVIDING META DATA INFORMATION, AND METHOD OF PROVIDING CONTENT

CROSS-REFERENCE TO RELATED PATENT APPLICATIONS

This application claims the benefit of Korean Patent Application No. 10-2007-0023196, filed on Mar. 8, 2007 in the Korean Intellectual Property Office, and the benefit of U.S. Provisional Patent Application No. 60/884,514, filed on Jan. 11, 2007 in the U.S. Patent and Trademark Office, the disclosures of which are incorporated herein in their entirety by reference.

BACKGROUND OF THE INVENTION

Field of the Invention

Aspects of the present invention generally relate to an apparatus and method for efficiently providing meta data information for content and the content to a user, and more particularly, to a meta data information providing server that provides meta data information, a client apparatus, and a method of providing meta data information and content by the client apparatus.

Description of the Related Art

FIG. 1 illustrates a conventional content providing service. A broadcasting service provider 110 transmits content and meta data information, such as electronic program guide (EPG) information, to a user terminal device 120 over a broadcasting network, such as terrestrial waves, satellites, and cables. The broadcasting service provider 110 extracts features from broadcasting multimedia content in order to generate meta data, edits the generated meta data, compresses content together with the meta data, performs synchronization and multiplexing, and unidirectionally transmits the content over the broadcasting network.

The user terminal device 120 unidirectionally receives and stores the meta data (such as EPG information) and the content that are provided from the broadcasting service provider 110 over the broadcasting network in order to provide the meta data and the content to a user. The user terminal device 120 shown in FIG. 1 includes a communication module for bidirectional communication in order to receive various services from a content service provider 130 that provides content over a bidirectional communication network. The content service provider 130 provides various services, such as information about the retrieval and position of content, interactive meta data, or content provided from the broadcasting service provider 110 to the user terminal device 120 over the bidirectional communication network, such as the Internet or Public Switched Telephone Network (PSTN).

TV-Anytime is a technique for allowing efficient data transmission and enabling a user to actively watch content through bidirectional communication between the user and a service provider. TV-Anytime is designed to allow a user to select and view desired audio/video (A/V) content at a desired time in an environment based on a terminal having a large-capacity storage medium (i.e., a personal digital recorder (PDR)). In TV-Anytime, meta data is content-related technical information that allows a user or an agent substituting for the user to easily search for or select user-desired content. A/V content and EPG information meta data is based on unidirectional transmission, and some additional EPG information may also be transmitted bidirectionally.

However, such a service is based on an assumption that the user terminal device 120 is a home broadcasting receiver or a set-top box, and thus cannot be used when the user terminal device 120 is a portable terminal. For example, when the broadcasting service provider 110 provides EPG information over a broadcasting network, all broadcasting program information included in the EPG information is also transmitted. As a result, a portable terminal device can use the broadcasting program information only after it stores the EPG information in its high-capacity memory. Moreover, when the user terminal device 120 is a portable terminal device, there is a need for a method of efficiently obtaining desired content over a bidirectional communication network on a screen that is provided for content retrieval.

SUMMARY OF THE INVENTION

Aspects of the present invention provide a meta data information providing server and a method of providing meta data to a client apparatus, in which the meta data information providing server can efficiently provide meta data information to the client apparatus without a need for a high-capacity memory in the client apparatus.

Aspects of the present invention also provide a client apparatus and a method of providing content, in which content can be efficiently obtained using received meta data information over a bidirectional communication network.

According to an aspect of the present invention, there is provided a meta data information providing server including: a meta data information generation unit to generate meta data information for content; and a meta data information transmission unit to control a connection with a client apparatus, wherein the meta data information includes fundamental meta data information required for the client apparatus to retrieve the content and detailed meta data information that is detailed information regarding, and the meta data information transmission unit transmits the fundamental meta data information in an initial stage of the connection with the client apparatus and transmits the detailed meta data information at a request of the client apparatus.

According to another aspect of the present invention, there is provided a client apparatus including: a communication unit to connect to a meta data information providing server that provides meta data information on content and to connect to at least one content providing servers that provides the content, the meta data information including fundamental meta data information required for a connection to the at least one content providing server and is received in an initial stage of a connection with the meta data information providing server; a meta data information processing unit to process the meta data information provided by the meta data information providing server; a content processing unit to process the content provided by the at least one content providing server; and a control unit to control the connection to the at least one content providing server based on the fundamental meta data information.

According to another aspect of the present invention, there is provided a method of providing meta data information, the method including: generating the meta data information including fundamental meta data information required for a client apparatus to retrieve content and detailed meta data information regarding the content; providing the fundamental meta data information to the client apparatus in an initial stage of a connection with the client apparatus; and providing the detailed meta data information to the client apparatus when the client apparatus requests the detailed meta data information, the detailed meta data information regarding single content information out of content information included in the fundamental meta data information.

According to yet another aspect of the present invention, there is provided a method of receiving content, the method including: connecting to a meta data information providing server that provides meta data on contents, receiving, from the meta data information providing server, fundamental meta data information that is required for retrieval of the content; selecting a desired content from among the content information included in the fundamental meta data information; connecting to one of at least one content providing server that provides the desired content using the fundamental meta data information; and obtaining the desired content from the connected content providing server.

According to still another aspect of the present invention, there is provided a method of receiving meta data information, the method including: connecting to a meta data information providing server that provides the meta data information on content; receiving, from the meta data information providing server, fundamental meta data information that is required to retrieve the content; and if additional information is requested for a desired content, requesting detailed meta data information on the desired content out of content information included in the fundamental meta data information and receiving the requested detailed meta data information on the desired content from the meta data information providing server.

According to another aspect of the present invention, there is provided a client apparatus including: a communication unit to connect to a meta data information providing server to receive fundamental meta data information required to connect to at least one content providing server that provides content and is received in an initial stage of a connection with the meta data information providing server; and a control unit to transmit, to the meta data information providing server, a request signal to request detailed meta data information on a desired content out of content information included in the fundamental meta data information if additional information is requested for the desired content, and to control the communication unit to receive the requested detailed meta data information from the meta data information providing server.

According to yet another aspect of the present invention, there is provided a system of providing content, the system including: at least one content providing server to provide content; a meta data information providing server that generates and selectively transmits fundamental meta data information required to retrieve the content from the at least one content providing server, and detailed meta data information that includes detailed information regarding the content; and a client apparatus that connects to the meta data information providing server to receive the fundamental meta data information in an initial stage of a connection to the meta data information providing server prior to receiving the detailed meta data information or the content, connects to one of the at least one content providing server, according to the fundamental meta data information, to receive the content, and connects to the meta data information providing server to receive the detailed meta data information of a desired content after requesting, from the meta data information providing server, detailed meta data information on the desired content out of content information included in the fundamental meta data information.

According to another aspect of the present invention, there is provided a recording medium for use with processor to access contents using meta data, the recording medium including: retrieval information used by the processor to retrieve the content from any of one or more content providing servers that provide the content; address information used by the processor to connect to any of the one or more content providing servers that provide the content; and state information used by the processor to determine an operating state of each of the one or more content providing servers.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages of the present invention will become more apparent and more readily appreciated by describing in detail exemplary embodiments thereof with reference to the accompanying drawings in which.

DETAILED DESCRIPTION OF THE EMBODIMENTS

Figure 1:
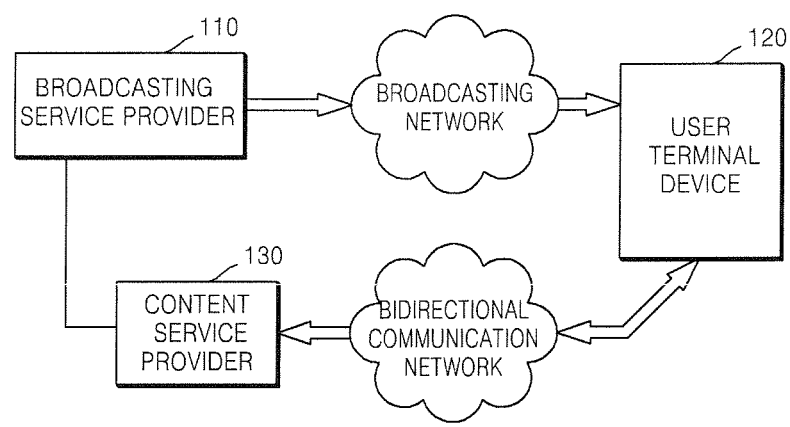
FIG. 1 illustrates a conventional content providing service.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Herein, content generally refers to various multimedia contents, such as broadcasting content and audio/video (A/V) content. The content may have various data or formats as long as the content is predetermined media content. Thus, the content may also be user created content (UCC) made and distributed by individuals, as well as content manufactured by a content manufacturer. Meta data refers to data about content, and additional information for content. When the content is broadcasted, meta data information may include electronic program guide (EPG) information. However, it is understood that the content can also include software executable by a receiver, such as for a game, in addition to or instead of the A/V content, and that the meta data can be other data beyond EPG.

Figure 2:
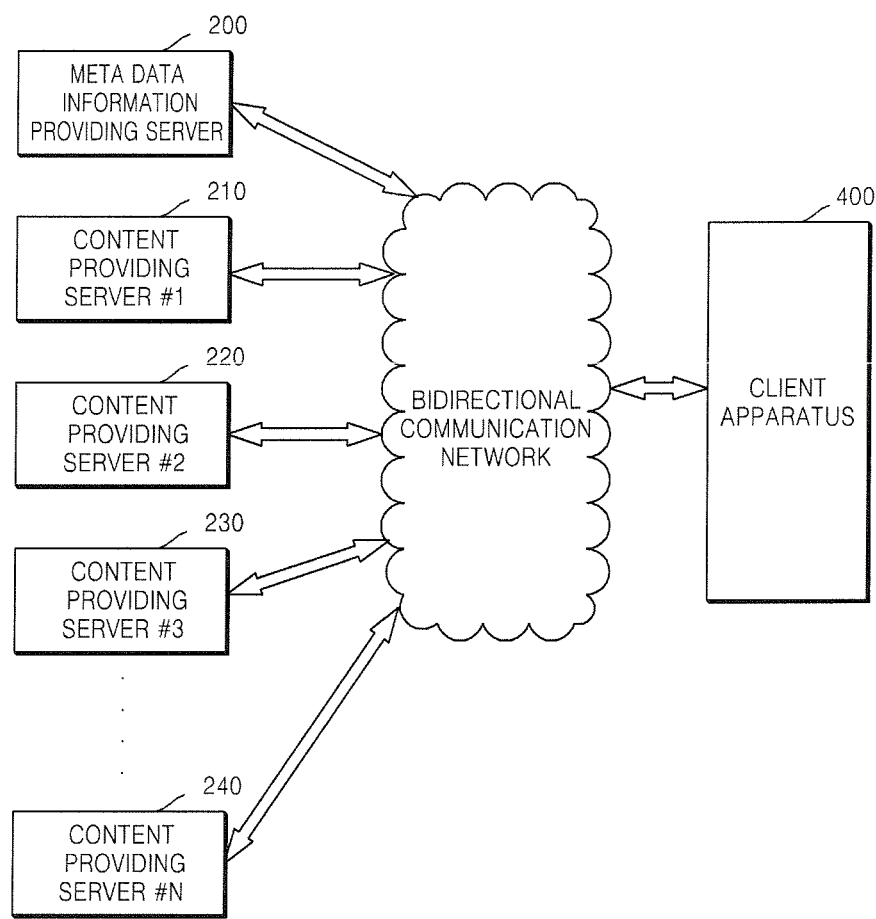
FIG. 2 illustrates an environment for providing a content service according to an embodiment of the present invention.

FIG. 2 illustrates an environment for providing a content service according to an embodiment of the present invention. A meta data information providing server 200 provides meta data information to a client apparatus 400. According to an aspect of the present invention, the meta data information providing server 200 does not provide all meta data information to the client apparatus 400. Instead, when the client apparatus 400 is connected, the meta data information providing server 200 first transmits fundamental meta data information, and then transmits detailed meta data information for predetermined content only at the request of the client apparatus 400. However, it is understood that in other aspects, the client apparatus 400 can separately receive a transmission of all meta data information, such as when connected to a system as in FIG. 1, or the server can optionally supply all meta data in addition to the fundamental and detailed meta data.

A plurality of content providing servers 210 through 240 commonly provide predetermined content desired by a user. For example, the content providing servers 210 through 240 illustrated in FIG. 2 may provide one episode of a TV drama. While shown as separate, it is understood that the meta data information providing server 200 may include at least one of the content providing servers 210 through 240 and thus be a server capable of providing both meta data information and content.

The client apparatus 400 is connected to the meta data information providing server 200 and one or more of the content providing servers 210 through 240 through a bidirectional communication network in order to receive meta data information and content and provide the meta data information and the content to the user.

Figure 3:
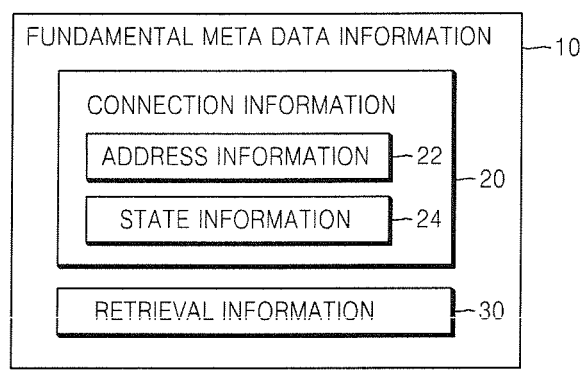
FIG. 3 illustrates fundamental meta data information according to an embodiment of the present invention.

FIG. 3 illustrates fundamental meta data information 10 according to an embodiment of the present invention. Referring to FIG. 3, the fundamental meta data information 10 is required for the client apparatus 400 to retrieve content. The fundamental meta data information 10 includes connection information 20 and retrieval information 30. However, it is understood that the fundamental meta data information 10 can include additional information and that the fundamental meta data information 10 need not be required as opposed to being used in all aspects of the present invention.

According to an embodiment of the present invention, the connection information 20 includes address information 22 and state information 24. The address information 22 is to connect to a content providing server, such as one of servers 210 through 240, and the state information 24 indicates the state of connection with a content providing server, such as one of servers 210 through 240. While not required in all aspects, the address information 22 may include information about an Internet Protocol (IP) and a port number, but can be other information used to locate a server across a wired and/or wireless network. While not required in all aspects, the state information 24 may include the maximum number of possible connections with a content providing server, the number of actual connections with a content providing server, a data transmission rate, or combinations thereof.

The connection information 20 may be defined for each predetermined content. When a plurality of content providing servers 210 through 240 provide the predetermined content (as illustrated in FIG. 2), the connection information 20 includes the address information 22 and the state information 24 with respect to each of the plurality of content providing servers 210 through 240 so as to locate each content on each server. However, it is understood that the connection information 20 can be otherwise constructed.

The retrieval information 30 is required for the user to retrieve content. For example, in existing meta data, such as TV-Anytime meta data, the retrieval information 30 serves to provide fundamental information regarding content to the user on a screen of the client apparatus 400. When content is broadcasting content, the retrieval information 30 may include information such as a broadcasting station, a broadcasting channel, a program title, and a program's scheduled time. However, it is understood that the retrieval information 30 need not include each of these items, can include additional items, or need only include content title information.

The retrieval information 30 may also include fundamental information required for the client apparatus 400 to play content. For example, the retrieval information 30 may also include a video data resolution and an audio data sampling rate that are required for the client apparatus 400 to play a broadcasting program. The retrieval information 30 may be generated by extracting representative information from detailed meta data information, such as a TV-Anytime meta data table list.

Figure 4:
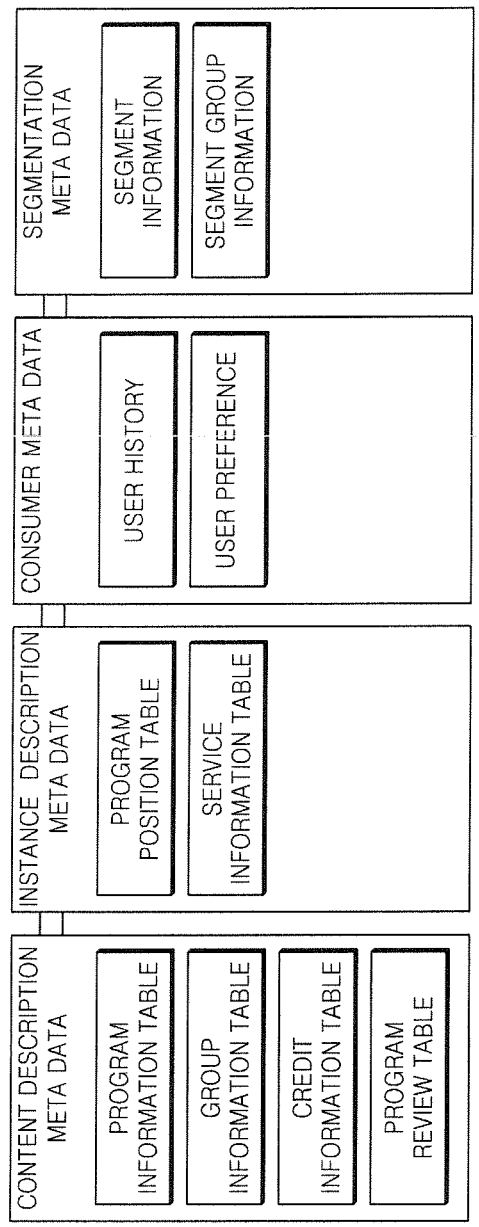
FIG. 4 illustrates detailed meta data information included in TV-Anytime meta data according to an embodiment of the present invention.

FIG. 4 illustrates detailed meta data information included in TV-Anytime meta data according to an aspect of the present invention. The detailed meta data information according to an embodiment of the present invention refers to the remaining meta data information except for the fundamental meta data information 10 shown in FIG. 3. For example, when a broadcasting program is a drama "Star Trek: Episode 15", detailed information, such as the synopsis, the star, and the characters of the drama, may be included in the detailed meta data information. While not required in all aspects, the TV-Anytime meta data can be as defined in the Phase I specifications or the ETSI TS 102 822 series specifications (January 2006).

The detailed meta data information according to an aspect of the present invention is transmitted from the meta data information providing server 200 to the client apparatus 400 at the request of the user. Furthermore, the detailed meta data information may have the same format as that of TV-Anytime meta data. The TV-Anytime meta data includes content description meta data, instance description meta data, consumer meta data, and segmentation meta data, as illustrated in FIG. 4. However, it is understood that the detailed meta data information need not include each of these items, can include additional items, or need only include content description meta data.

The content description meta data describes content (e.g., a broadcasting program) or a group of contents. The instance description meta data is associated with execution of a program. The consumer meta data describes user preference and user history. The segmentation meta data describes a portion of a program.

Referring back to FIG. 2, according to an embodiment of the present invention, the meta data information providing server 200 transmits the fundamental meta data information 10 to the client apparatus 400 in an initial stage of connection with the client apparatus 400. Because the detailed meta data information has a format as illustrated in FIG. 4 for each content, the amount of transmission would be large if detailed meta data information for all contents was transmitted. However, according to an aspect of the present invention, the client apparatus 400 provides a meta data information providing screen generated using the fundamental meta data information 10 and requests meta data information regarding predetermined content from the meta data information providing server 200 in order to receive detailed meta data information regarding the predetermined content. A high-capacity memory would be necessary to receive and store meta data regarding all the contents. However, according to aspects of the present invention, only requested detailed meta data information is received. Therefore, the client apparatus 400 does not need a high-capacity memory.

When the user selects single content information from the provided fundamental meta data information 10 and requests playback of the selected content, the client apparatus 400 can rapidly access the content providing servers 210 through 240 and obtain the selected content because the client apparatus 400 already has the address information 22 and the state information 24. That is, the address information 22 and the state information 24 are already received with the fundamental meta data information 10 and stored by the client apparatus 400 in order to connect to the content providing servers 210 through 240 that provide contents. Furthermore, if the meta data information does not contain information about a content providing server 210 through 240, the client apparatus 400 can still connect to the content providing server by requesting and receiving information required to connect to the content providing server 210 through 240 from the meta data information providing server 200.

Figure 5:
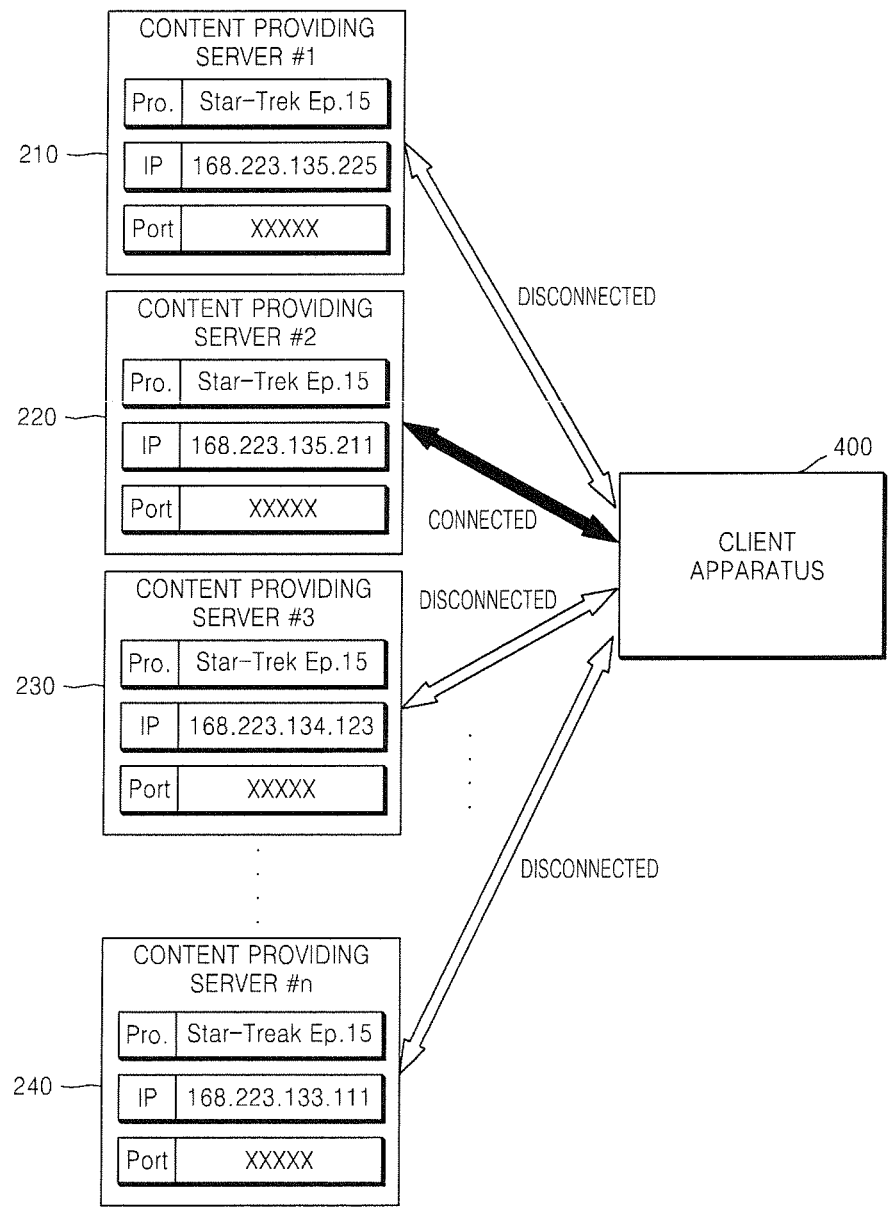
FIG. 5 is a view explaining a process in which a client apparatus according to an embodiment of the present invention selects a content providing server in order to obtain content using connection information.

FIG. 5 is a view explaining a process in which the client apparatus 400 selects a content providing server 210, 220, 230, or 240 in order to obtain content using the connection information 20. Referring to FIG. 5, the client apparatus 400 receives the fundamental meta data information 10 in an initial stage of connection with the meta data providing server 200 (shown in FIG. 6). Since the fundamental meta data information 10 includes the connection information 20 (as described with reference to FIG. 3), the client apparatus 400 can connect to a desired content providing server 210, 220, 230, or 240 using the connection information 20 in order to retrieve desired content.

The connection information 20 includes the address information 22 to connect to at least one content providing server 210, 220, 230, or 240 and the state information 24 regarding at least one content providing server 210, 220, 230, or 240. The state information 24 may include the maximum number of possible connections with a content providing server 210, 220, 230, or 240, the number of actual connections with a content providing server, a data transmission rate, or combinations thereof. Thus, the client apparatus 400 sets the order of connection priority for the at least one content providing server 210, 220, 230, or 240 using the state information 24 and attempts to connect to one of the content providing servers 210, 220, 230, or 240 according to the set order of connection priority. The order of connection priority may be set a variety of ways using information included in the state information 24.

As illustrated in FIG. 5, when the user requests playback of "Star Trek: Episode 15," the client apparatus 400 sets the order of connection priority for the content providing servers 210 through 240. The content providing server 220 having the highest connection priority may be determined as a content providing server capable of optimally providing content (for example, with a highest transmission rate) to the client apparatus 400. If the content providing server #2 220, for example, is determined to have the highest connection priority, the client apparatus 400 connects to the content providing server 220 #2 to receive the content.

Figure 6:
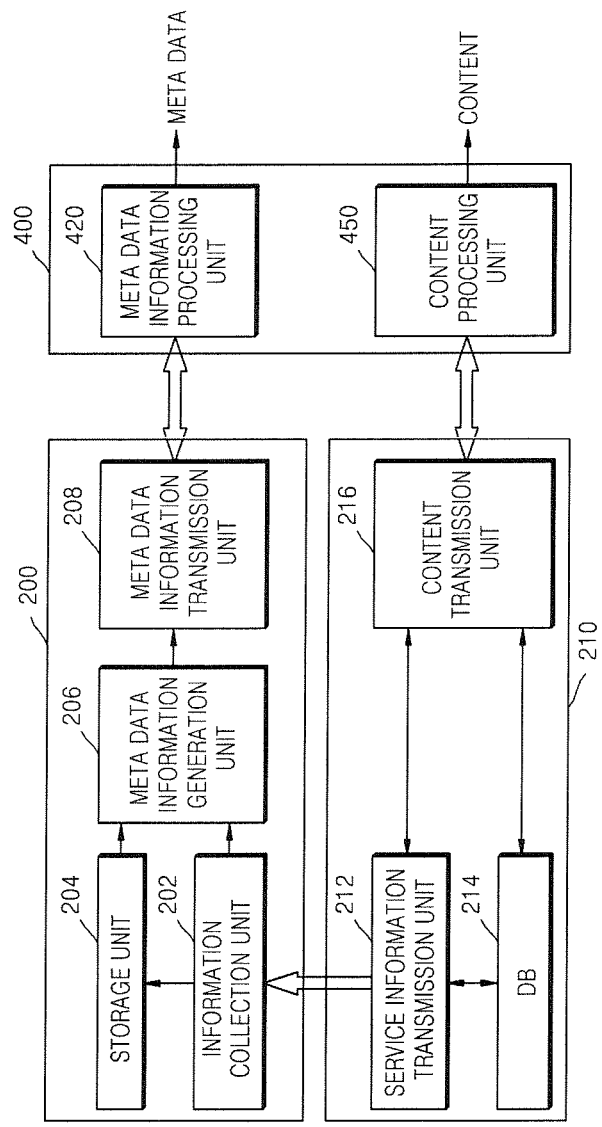
FIG. 6 is a block diagram of a meta data and content providing system including a meta data information providing server, a content providing server, and a client apparatus according to an embodiment of the present invention.

FIG. 6 is a block diagram of a meta data and content providing system including the meta data information providing server 200, the content providing server 210, and the client apparatus 400 according to an embodiment of the present invention. Referring to FIG. 6, the meta data information providing server 200 includes an information collection unit 202, a storage unit 204, a meta data information generation unit 206, and a meta data information transmission unit 208.

The information collection unit 202 collects meta data information regarding content. The information collection unit 202 may receive information regarding content from the content providing server 210 (as illustrated in FIG. 6), collect meta data from an external database (not shown) that stores meta data regarding content of the server 210, or otherwise receive such information in aspects of the invention. Furthermore, the information collection unit 202 connects to at least one content providing server 210 in order to collect information about a network state for each of the content providing servers. The information about the network state is used to generate connection information 20 included in the fundamental meta data information 10. The storage unit 204 stores the information collected by the information collection unit 202.

Using the collected information, the meta data information generation unit 206 generates the fundamental meta data information 10 to be provided to the client apparatus 400 for content retrieval and generates detailed information regarding content corresponding to content information included in the fundamental meta data information 10 (i.e., the detailed meta data information). The generation unit 206 receives the information from the storage unit 204 and/or the collection unit 202 in aspects of the invention.

The meta data information transmission unit 208 processes meta data information 10 and transmits the processed meta data information 10 to the client apparatus 400. For example, with TV-Anytime meta data, the meta data information transmission unit 208 transmits meta data information after performing fragmentation, binary encoding, and encapsulation on the meta data information. During fragmentation, meta data is classified into content description meta data, instance description meta data, consumer meta data, and segmentation meta data. These different meta data classifications are transmitted in units of a "fragment" that can be independently transmitted, updated, and accessed. Binary encoding is performed in such a way to reduce the size of each text-format fragment generated after the fragmentation and improve bandwidth efficiency and decoding efficiency. For TV-Anytime meta data, Binary format for Moving Picture Experts Group (MPEG)-7 (BiM) may be used as the binary encoding. Encapsulation involves encapsulating each encoded fragment having version information and ID information attached thereto into an access unit called a data container. It is understood that according to other aspects, the processing of the meta data may involve other methods, other forms of encoding, and other classifications.

The meta data information transmission unit 208 transmits fundamental meta data information 10 in an initial stage of connection with the client apparatus 400, and transmits detailed meta data information only at the request of the client apparatus 400.

The content providing server 210 includes a service information transmission unit 212, a database 214, and a content transmission unit 216. The service information transmission unit 212 transmits, to the meta data information providing server 200, configuration information regarding content, such as service information required for the meta data information providing server 200 to generate meta data information. The service information transmission unit 212 may retrieve service information regarding each content from the database 214 and transmit the service information to the meta data information providing server 200, but need not in all aspects.

Upon request for content from the client apparatus 400, the content transmission unit 216 transmits the requested content to the client apparatus 400. While not required in all aspects, the client apparatus 400 includes a meta data information processing unit 420 to process meta data information, and a content processing unit 450 to decode content. The meta data information processing unit 420 processes and outputs meta data information received from the meta data information providing server 200. The content processing unit 450 processes and outputs content received from the content providing server 210.

Figure 7:
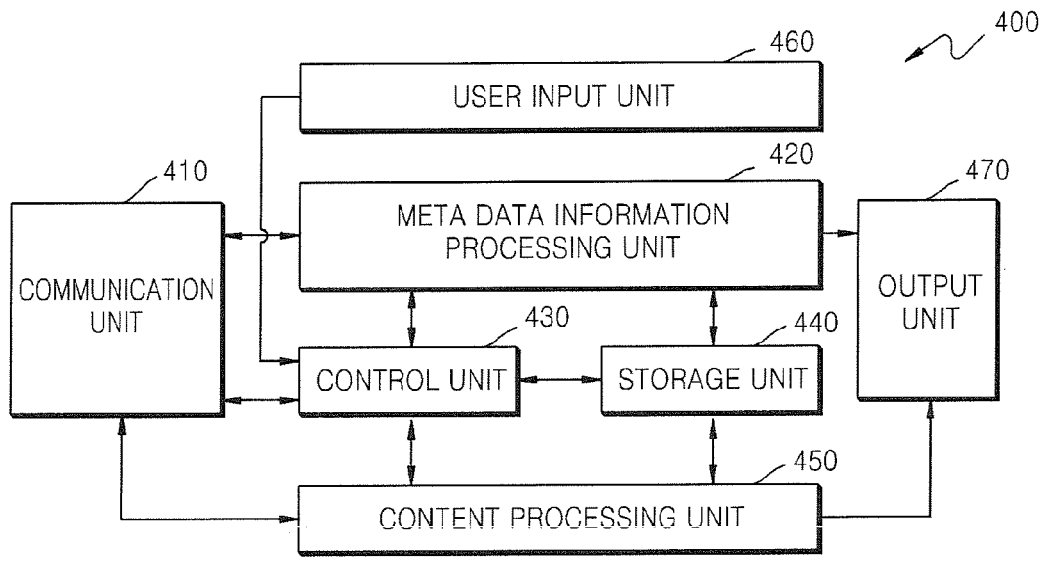
FIG. 7 is a block diagram of a client apparatus according to an embodiment of the present invention.

FIG. 7 is a block diagram of the client apparatus 400 according to an embodiment of the present invention. Referring to FIG. 7, the client apparatus 400 includes a communication unit 410, the meta data information processing unit 420, a control unit 430, a storage unit 440, the content processing unit 450, a user input unit 460, and an output unit 470. While not required in all aspects, it is understood that the client apparatus 400 can be a portable multimedia player, a cellular telephone, a personal digital assistant, or any portable multimedia player.

The communication unit 410 controls data transmission and/or reception to/from the meta data information providing server 200 and the content providing server 210. The meta data information processing unit 420 processes meta data information received from the meta data information providing server 200. Once the communication unit 410 connects to the meta data information providing server 200, the communication unit 410 receives the fundamental meta data information 10 from the meta data information providing server 400 and the meta data information processing unit 420 processes the received fundamental meta data information 10.

After processing the fundamental meta data information 10, the meta data information processing unit 420 outputs the processed fundamental meta data information 10 to the output unit 470 in order to provide the fundamental meta data information 10 to the user. For example, the fundamental meta data information 10 may be provided through an EPG screen. The output unit 470 can be a display and/or an output to an external display that is detachable from the apparatus 400. Further, while shown separately, it is understood that the output unit 470 and the input unit 460 can be combined.

The control unit 430 controls data transmission and/or reception between components included in the client apparatus 400. Specifically, the control unit 430 controls a connection with at least one content providing server using connection information 20 (as illustrated in FIG. 3) that is included in the fundamental meta data information 10 for content retrieval. The connection information 20, as described above, is information regarding at least one content providing server. The control unit 430 transmits, to the meta data information providing server 200, a request signal to request detailed meta data information regarding a single content information out of content information included in the fundamental meta data information 10. Here, the single content information may be selected according to a user input signal input through the user input unit 460. According to other aspects, the single content information may be automatically selected with a selection of content to be played back from among the content included in the fundamental meta data information 10. The control unit 430 then controls the communication unit 410 to receive the detailed meta data information requested from the meta data information providing server 200. In this way, since the detailed meta data information is selectively received for user desired content as opposed to all content, the client apparatus 400 can efficiently receive and use meta data without requiring a large-capacity memory.

As an example, keyword information may be input as a request signal to request detailed meta data information regarding predetermined content information through the user input unit 460. Then, the control unit 430 may process the keyword information for transmission to the meta data information providing server 200. As such, it is understood that the received meta data 10 can be stored locally in RAM or more permanently on a medium such as a hard disk.

If a user input signal to request playback of content that is selected from among contents included in the fundamental meta data information 10 is input through the user input unit 460, the control unit 430 controls the communication unit 410 in order to determine the order of connection priority for content providing servers that provide the selected content. The control unit 430 determines the order of connection priority for the content providing servers using the fundamental meta data information 10. In particular, the control unit 430 determines the order of connection priority using the state information 24 included in the connection information 20. The state information 24 may include the maximum number of possible connections with a content providing server, the number of actual connections with a content providing server, a data transmission rate, or combinations thereof. Once the order of connection priority is determined, the control unit 430 controls the communication unit 410 to connect to a content providing server having the highest connection priority using the address information 22 (as illustrated in FIG. 3) of the content providing server having the highest connection priority.

The control unit 430 may control the communication unit 410 to sequentially attempt to connect to content providing servers according to the determined order of connection priority. For example, the control unit 430 may first attempt to connect to a content providing server having the highest connection priority. However, if the first attempt to connect to the content providing server having the highest connection priority fails, the control unit 430 may then attempt to connect to another content providing server having the next highest connection priority. Once connected to a content providing server, the control unit 430 controls the communication unit 410 to request selected content from the connected content providing server 210 and to receive the requested content.

Upon receipt of the content from the content providing server 210, the content processing unit 450 processes the received content. The storage unit 440 stores received fundamental meta data information 10. Detailed meta data information may, although not necessarily, be temporarily stored in the storage unit 440 or externally (such as in a removable flash memory card).

The user input unit 460 receives a user input signal and transmits the user input signal to the control unit 430. The control unit 430 controls the client apparatus 400 to operate according to the user input signal. The output unit 470 may include a display device (not shown) and/or an audio output device (not shown) in order to output meta data and content.

Figure 8:
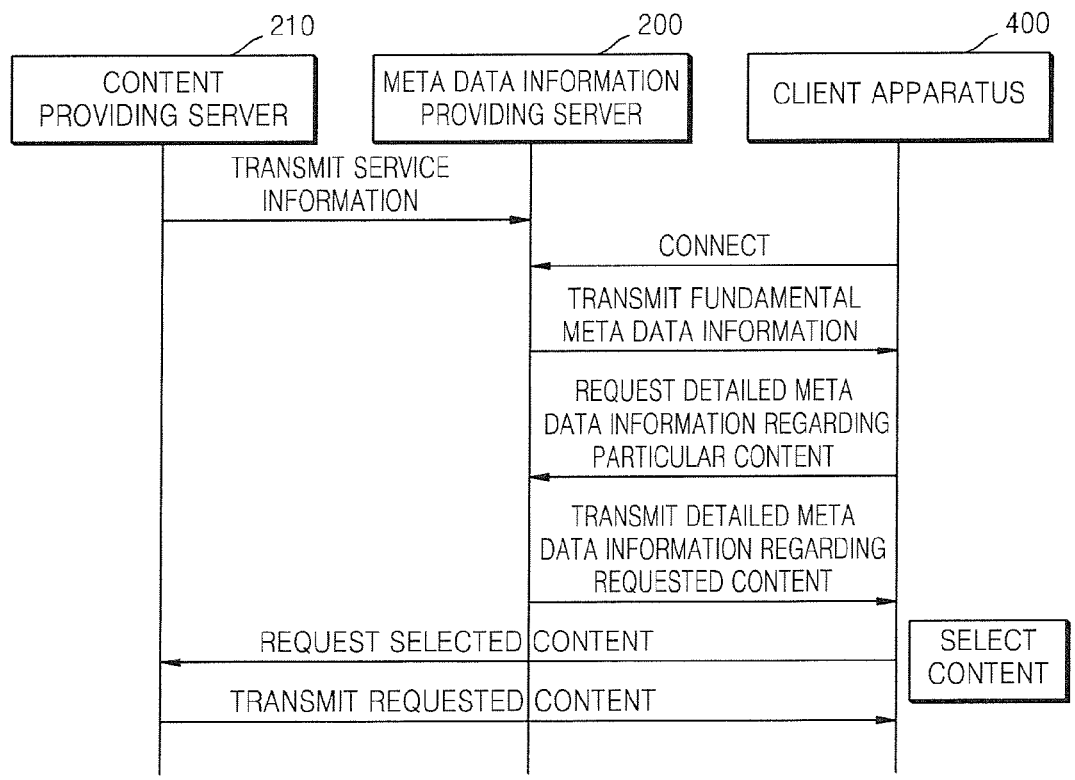
FIG. 8 illustrates a process of providing meta data information and a process of providing content according to an embodiment of the present invention.

FIG. 8 illustrates a process of providing meta data information and a process of providing content according to an embodiment of the present invention. The content providing server 210 transmits service information to the meta data information providing server 200. The meta data information providing server 200 generates meta data information using the received service information. The meta data information providing server 200 also collects information about a network state for content providing servers (including the content providing server 210) and generates the fundamental meta data information 10 using the collected information. While not required in all aspects, the fundamental meta data information 10 can be stored in the storage unit 204 of FIG. 6, generated based on stored information in the storage unit 204, or generated directly as the information is received by the information collection unit 202.

When the client apparatus 400 connects to the meta data information providing server 200, the meta data information providing server 200 transmits the fundamental meta data information 10 to the client apparatus 400. Then, the client apparatus 400 provides the fundamental meta data information 10, such as to the user. If the user inputs a user input signal requesting detailed information regarding particular content, the client apparatus 400 requests detailed meta data information regarding the particular content. The meta data information providing server 200 then transmits the requested detailed meta data information to the client apparatus 400.

If the user selects particular content from among the content included in the fundamental meta data information 10 and requests playback of the selected content, the client apparatus 400 may determine a content providing server capable of optimally providing the selected content. Specifically, the client apparatus 400 may use the address information 22 and the state information 24 (as illustrated in FIG. 3) of content providing servers that provide predetermined content that are included in the received fundamental meta data information 10. If the content providing server 210 is determined as the optimal content providing server from among the content providing servers, the content providing server 210 is requested to provide the selected content. The content providing server 210 transmits the content requested by the client apparatus 400. However, if the content providing server 210 fails to transmit the content request by the client apparatus 400, another content providing server (such as the next optimal content providing server) is requested to provide the selected content. The client apparatus 400 processes the received content and then provides the processed content to the user.

Figure 9:
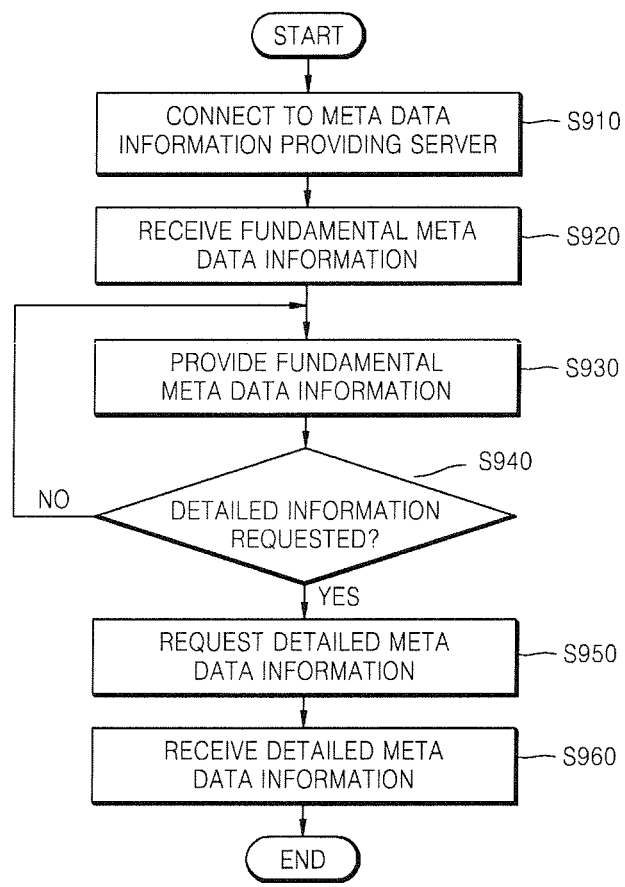
FIG. 9 is a flowchart of a method of providing meta data information according to an embodiment of the present invention.

FIG. 9 is a flowchart of a method of providing meta data information according to an embodiment of the present invention. In operation S910, the client apparatus 400 (as illustrated in FIGS. 6 and 7) connects to a meta data information providing server 200 (as illustrated in FIG. 6) that provides meta data of at least one content. In operation S920, the client apparatus 400 receives the fundamental meta data information 10 (as illustrated in FIG. 3) from the meta data information providing server 200. The fundamental meta data information 10 includes information provided to the user for content retrieval.

In operation S930, the client apparatus 400 processes the received fundamental meta data information 10 and provides the processed fundamental meta data information 10 to the user. If a user input signal requesting detailed information regarding a particular content information from among content information included in the fundamental meta data information 10 is received in operation S940, the client apparatus 400 requests detailed meta data information from the meta data information providing server 200 in operation S950. In operation S960, the client apparatus 400 receives and processes the detailed meta data information requested from the meta data information providing server 200 and provides the processed detailed meta data information to the user.

Figure 10:
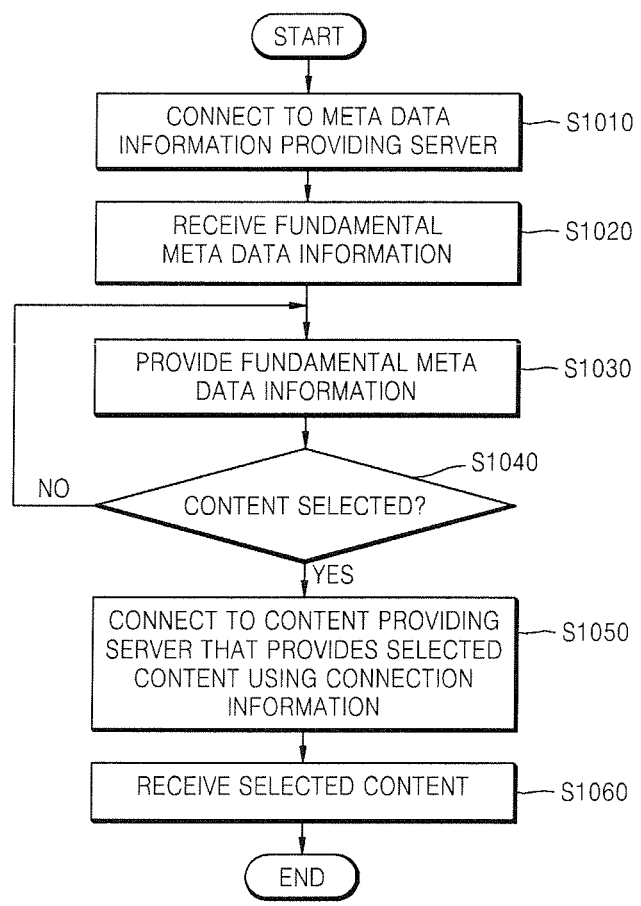
FIG. 10 is a flowchart of a method of providing content according to an embodiment of the present invention.

FIG. 10 is a flowchart of a method of providing content according to an embodiment of the present invention. In operation S1010, the client apparatus 400 (as illustrated in FIGS. 6 and 7) connects to the meta data information providing server 200 (as illustrated in FIG. 6) that provides meta data of at least one content. In operation S1020, the client apparatus 400 receives the fundamental meta data information 10 (as illustrated in FIG. 3) that is provided for content retrieval from the meta data information providing server 200. The fundamental meta data information 10 includes connection information 20 of at least one content providing server that provides predetermined content.

In operation S1030, the client apparatus 400 processes the fundamental meta data information 10 in order to provide the fundamental meta data information 10 for retrieval of content information. If the user input signal selecting a predetermined content and requesting the selected content is input in operation S1040, the client apparatus 400 connects to one of the content providing servers that provide the selected content using the connection information 20 included in the fundamental meta data information 10 in operation S1050. Then, the client apparatus 400 receives the selected content from the connected content providing server in operation S1060.

The client apparatus 400 determines the order of connection priority for the content providing servers that provide predetermined content using the connection information 20 included in the fundamental meta data information 10. According to the determined order of connection priority, the client apparatus 400 then connects to one of the content providing servers in order to obtain the content. The client apparatus 400 may sequentially attempt to connect to the content providing servers according to the determined order of connection priority until the client apparatus 400 succeeds in connecting to a content providing server. Once connected to the content providing server, the client apparatus 400 requests the selected content from the connected content providing server.

While not required, aspects of present invention can also be embodied as computer readable code on one or more computer readable recording media to be implemented on one or more computers and/or processors. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer readable recording medium can also be distributed over network coupled computer systems so that the computer readable code is stored and executed in a distributed fashion.

As described above, according to aspects of the present invention, when the client apparatus connects to a meta data information providing server, the client apparatus receives fundamental meta data information and may additionally receive detailed meta data information regarding user desired content, thereby efficiently using meta data information with limited performance and memory capacity. Therefore, the client apparatus does not require a separate storage space or a high-capacity storage to store the meta data information.

Moreover, it is possible to rapidly access a content providing server that provides user desired content using the fundamental meta data information received from the meta data information providing server. Furthermore, the client apparatus can determine the order of connection priority for content providing servers that commonly provide predetermined content using the connection information included in the fundamental meta data information, thereby selecting a content providing server capable of optimally providing the content.

Even when the user retrieves content and desires to play back the retrieved content, the user can be rapidly provided with the desired content by connecting to a content providing server that provides the desired content without a need to request and receive information regarding the content providing server.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing meta data information, the method comprising:
   generating, in a meta data information providing server, the meta data information including fundamental meta data information required for a client apparatus to retrieve content and detailed meta data information regarding the content;
   automatically providing the fundamental meta data information from the meta data information providing server to the client apparatus in response to an initial connection with the client apparatus before a request is made by the client apparatus for meta data information, the fundamental meta data information comprising retrieval information including at least one of a video data resolution of the content and an audio data sampling rate of the content to be retrieved for the client apparatus to reproduce the content; and
   selectively providing the detailed meta data information from the meta data information providing server to the client apparatus when the client apparatus requests the detailed meta data information based upon the provided fundamental meta data information.

2. The method as claimed in claim 1, wherein the providing of the detailed meta data information comprises:
   providing a first detailed meta data information corresponding to a first content selected in the client apparatus, according to a user input signal, out of content information included in the fundamental meta data information.

3. The method as claimed in claim 1, wherein the fundamental meta data information further comprises:
   connection information including information on at least one content providing server that provides the content.

4. The method as claimed in claim 3, wherein the connection information comprises address information required for the client apparatus to connect to each of the at least one content providing server and state information which also indicates an operating state of each of the at least one content providing server.

5. The method as claimed in claim 4, wherein the state information further comprises at least one of a number of actual connections to each of the at least one content providing server, a maximum number of possible connections to each of the at least one content providing server and a data transmission rate for each of the at least one content providing server.

6. The method as claimed in claim 3, wherein first connection information is defined for a first content and second connection information, different from the first connection information, is defined for a second content.

7. A non-transitory computer readable recording medium encoded with instructions for performing the method of claim 1 implemented by a computer.

8. The method as claimed in claim 1, wherein the detailed meta data information comprises contents description metadata, instance description metadata, consumer metadata and segmentation metadata.

9. The method as claimed in claim 1, wherein at least one content providing server having a highest connection priority set by the client apparatus is determined as the content providing server among a plurality of content providing servers capable of optimally providing the content.

10. An apparatus to provide meta data information, the apparatus comprising:
   a processor configured to generate the meta data information including fundamental meta data information required for a client apparatus to retrieve content and detailed meta data information regarding the content; and
   a transmitter configured:
     to automatically provide the fundamental meta data information to the client apparatus in response to an initial connection with the client apparatus before a request is made by the client apparatus for meta data information, the fundamental meta data information comprising retrieval information including at least one of a video data resolution of the content and an audio data sampling rate of the content to be retrieved for the client apparatus to reproduce the content; and
     to provide selectively the detailed meta data information to the client apparatus when the client apparatus requests the detailed meta data information based upon the provided fundamental meta data information.

11. The apparatus as claimed in claim 10, wherein the transmitter is further configured to provide a first detailed meta data information corresponding to a first content selected in the client apparatus, according to a user input signal, out of content information included in the fundamental meta data information.

12. The apparatus as claimed in claim 10, wherein the fundamental meta data information further comprises:
   connection information including information on at least one content providing server that provides the content.

13. The apparatus as claimed in claim 12, wherein the connection information comprises address information required for the client apparatus to connect to each of the at least one content providing server and state information which also indicates an operating state of each of the at least one content providing server.

14. The apparatus as claimed in claim 13, wherein the state information further comprises at least one of a number of actual connections to each of the at least one content providing server, a maximum number of possible connections to each of the at least one content providing server and a data transmission rate for each of the at least one content providing server.

15. The apparatus as claimed in claim 12, wherein first connection information is defined for a first content and second connection information, different from the first connection information, is defined for a second content.

16. The apparatus as claimed in claim 10, wherein the detailed meta data information comprises contents description metadata, instance description metadata, consumer metadata and segmentation metadata.

17. The apparatus as claimed in claim 10, further comprising:
    a receiver configured to collect information regarding content from at least one content providing server or an external database and to collect network state information about at least one content providing server; and
    a storage configured to store the information regarding content from the at least one content providing server or the external database and to store the network state information about the at least one content providing server,
    wherein the network state information is used to generate connection information to be included in the fundamental meta data information.

* * * * *